United States Patent [19]
Dudley

[11] 4,157,047
[45] Jun. 5, 1979

[54] HAND SAW WORK HOLDER
[76] Inventor: Alex Dudley, 220 Edgewood Rd., Lansing, Mich. 48910
[21] Appl. No.: 782,729
[22] Filed: Apr. 19, 1977
[51] Int. Cl.² ............................................. B23D 63/00
[52] U.S. Cl. ........................................ 76/76; 76/78 R
[58] Field of Search ............... 76/75, 76, 78, 43, 34, 76/40, 41; 269/60, 65; 51/218 R

[56] References Cited
U.S. PATENT DOCUMENTS

| | | | |
|---|---|---|---|
| 789,119 | 5/1905 | Clemons | 76/34 |
| 1,491,706 | 4/1924 | Klin | 76/76 X |
| 2,675,717 | 4/1954 | Standal | 76/41 |
| 2,786,310 | 3/1957 | Jansson | 51/98 SP |
| 3,304,811 | 2/1967 | Dewitt | 76/43 |
| 3,590,664 | 7/1971 | Aijala | 76/76 X |

*Primary Examiner*—Nicholas P. Godici

[57] ABSTRACT

A device for holding a hand saw firmly in place on a traversing table, and employing in combination, a lead screw, a tracing dog, index plate, and index stop, all of which cooperate to evenly divide and space the teeth per inch of hand saw, while presenting each tooth to be sharpened or set.

2 Claims, 6 Drawing Figures

HAND SAW WORK HOLDER

This application is related to and discloses some common subject matter with Ser. No. 605,730 filed Aug. 18, 1975, now abandoned and Ser. No. 605,731 filed Aug. 18, 1975 and now abandoned. This device for holding hand saws can also be used with the sharpening device of my U.S. Pat. No. 4,016,781, or the setting device of my U.S. Pat. No. 4,018,108.

BACKGROUND

The equipment for sharpening and setting hand saws has become increasingly mechanical and complicated, and demands a considerable amount of time and technical skill to set up and to operate.

A sharpening apparatus is disclosed in U.S. Pat. No. 3,455,187 for sharpening saws of various types and teeth of various shapes, by means of cams, gears, pawls, etc., and requiring various adjustments for the differing types and shapes of teeth.

Therefore, it is the object of this invention to provide a much simplified and improved device for holding a hand saw to be sharpened or set. A holder, which in addition to holding the saw, accurately divides and properly spaces the teeth of a hand saw, while presenting the serrated edge of the saw for sharpening, setting, or complete re-toothing.

Another object is to provide a work holder which is fairly light and portable, and which can be easily set up and used on construction sites and ships, in hardware stores, machine shops, or any other place where a great many saws require maintenance or restoration.

It is a further object to provide a hand saw work holder which will require a minimum of adjustment and very little operator skill; one that can be operated with ease and rapidity; one which will accurately and quickly divide and space the teeth per inch of saw while presenting each tooth for sharpening or setting, without the complication of cams, gears, pawls, etc., enabling an operator to restore a hand saw to it's original usefulness with speed and precision.

DESCRIPTION OF WORK HOLDER

Figure 1:
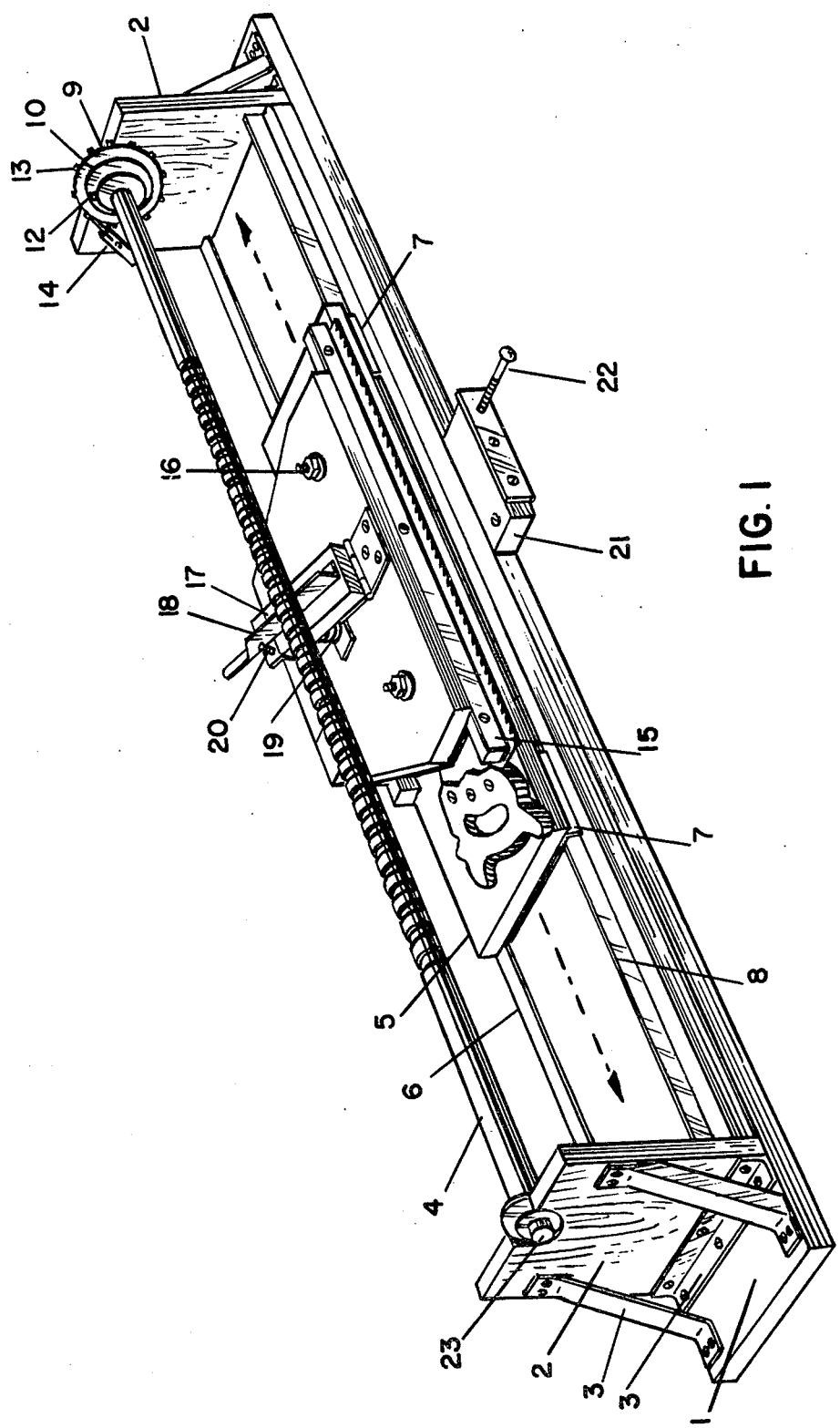
FIG. 1 is a three dimentional view of my saw holding apparatus, showing the elongated table and lead screw; also the traversing table with clampable means holding a saw, and the tracing dog in position under the lead screw. The ball bearing saddle is shown at left and the index plate and stop are on right end panel.
Figure 2:
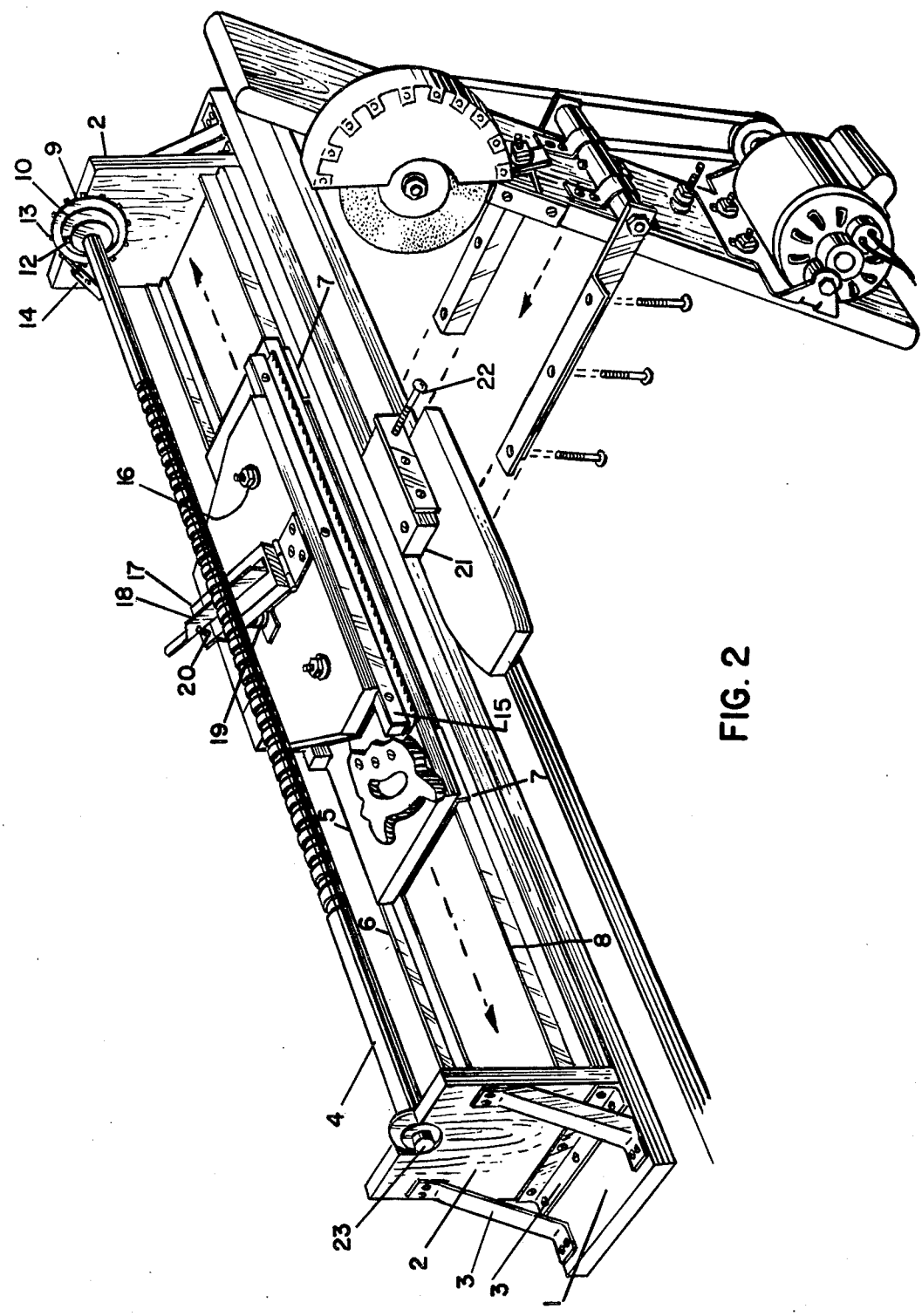
FIG. 2 is a view of the work holder in relation to the rocker panel of my U.S. Pat. No. 4,016,781.

The hand saw work holder as shown in FIG. 1 consists of an elongated wooden base table 1 of sufficient length to support at each end a panel 2. Each panel is secured to the base table 1 by metal angles 3; said panels each forming a saddle on which a lead screw of sufficient length to accomodate any size hand saw revolves in dust proof ball bearing saddle 23. This arrangement allows the lead screw 4 to be easily lifted from the saddle for changing the index plate 9 when necessary.

Figure 3:
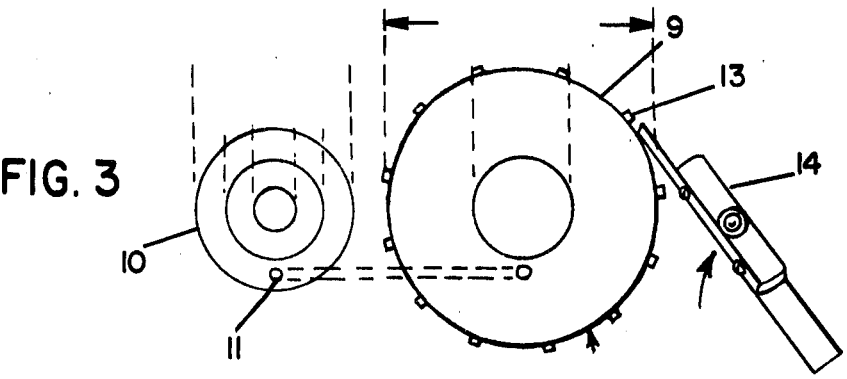
FIG. 3 is a top view of the index plate, demonstrating the cleats, the stop, and the housing on which it fits and is bolted.
Figure 4:
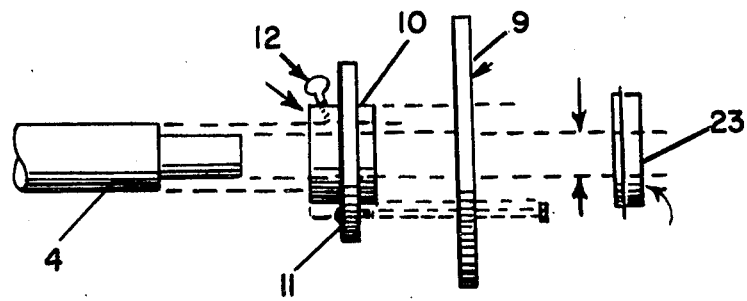
FIG. 4 is a side view of the index plate, the flange of the housing on which it is bolted and which is secured on the end of the lead screw, all of which revolves with the lead screw as it revolves in the ball bearing saddle, also shown.

In FIG. 1, on the right end of the lead screw 4, and in more detail in FIGS. 3 and 4, the index plate is shown; the index plate 9 and the housing 10 over which the index plate 9 is secured against the flange by a bolt and nut, as shown in FIG. 4, at 11. FIG. 4 also shows how the housing 10 fits over the end of the lead screw 4 and the end of the lead screw rides in the saddle bearing 23. Housing 10 is firmly secured to end of the lead screw by a thumb screw 12, all thereafter revolving in saddle 23.

FIG. 3 shows plainly the index plate 9, the cleats, with varying spaces to divide accurately the number of teeth per inch of saw, and the stop 14, and the manner in which it clicks at each cleat 13, allowing the operator to accurately space the teeth of a saw. There is a plurality of index plates to accomodate and direct the incremental advances of the means in which the saw is positioned and supported, in cooperation with the stop-finger 14.

In FIG. 1 we see a traversing table 5 centered on the base table 1 and directly under the lead screw 4. The traversing table 5 rests on a flat metal strip 6 at the back of the base table 1, and it's nylon lined guides 7 glide on the top of an angle 8 in front, or the edge nearest the operator; the angle 8 in front, being 1½" higher than the flat back strip 6 results in a pressure of the guides on the front angle which maintains the alignment of the traversing table as it carries the clampable means and the saw blade.

The traversing table 5 has a clampable means 15 of securing the saw in a horizontal plane with the teeth in operable relation to a sharpening or setting device, and means 16 of releasably locking the saw firmly in place. A coil spring (not shown) under each bolt 16, clamps the saw firmly, and when the bolts are released, the jaws of the saw holding device open easily for removal of the saw blade.

Figure 5:
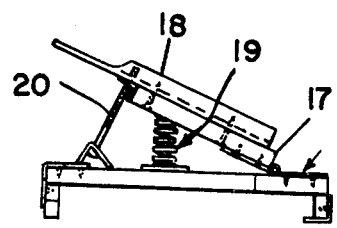
FIG. 5 is a side view of the tracing dog, showing the spring and the adjustable bolt by which it is depressed or released.
Figure 6:
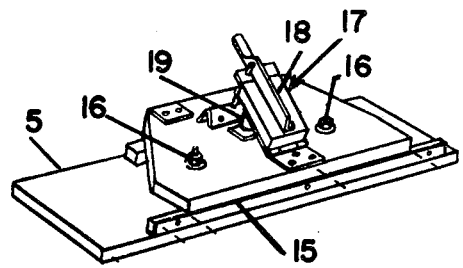
FIG. 6 is an overall view of the traversing table showing the nylon guides on which it glides, the clamping device which holds the saw, the bolts controlling the springs between the clamping device and the traversing table, and the tracing dog in position.

Again in FIG. 1 and FIGS. 4 and 5, in the center of the clampable saw holding device is a hinged wooden block 17 on which is mounted a tracing dog 18. There is a heavy coil spring 19 under the tracing dog, which, when released forces the tracing dog into a groove of the lead screw; when the dog 18 is maintained in a groove of the lead screw the traversing table 5 moves as the lead screw 4 revolves, and the clampable table 15 carries the saw, stopping at each tooth for sharpening or setting as demanded by the index plate 9 which the operator has selected and stop 14.

When the adjustable bolt 20 on the tracing dog 18 is depressed, the traversing table 5 can be pushed either way for alignment of the saw. When bolt 20 is released tracing dog 18 engages in a groove of the lead screw.

In using the hand saw work holder with my Device for Gumming and Sharpening Circle Saws, Patent No. 4016781 the operator releasably locks the sharpening device to the center of the base table of the work holder. He selects an index plate for the proper number of teeth per inch of saw to be sharpened, and, lifting the right end of the lead screw, places the index plate over the hub of the housing, securing it against the flange of housing by locking bolt and nut 11. He then secures the saw in the clamping means on the traversing table, positioning the serrated edge of the saw in operable relation to the cutting disc of the sharpening device and secures bolts 16.

With the tracing dog 18 in depressed position, the traversing table can be easily moved either way laterally. The operator quickly checks the alignment of the saw by pushing the traversing table carrying the saw to the last tooth of the saw against the edge of the cutting disc (which is properly ground to the shape of the tooth) he then slides it back to the first tooth. Operator brings the cutting disc to the root diameter of the tooth and adjusts the positive stop which is located on the sharpening device.

With the saw clamped in the holding device and the tracing dog 18 in released position, operator turns the lead screw, bringing the first tooth to the cutting disc; he then secures the index plate to lead screw by tightening thumb screw 12, and released tracing dog engages in a groove of lead screw; as he continues to turn the lead screw with the left hand, each tooth of the saw is accurately indexed and spaced as it is presented for sharpening; since the saw blade and the cutting disc are in close proximity, only a light touch is required to advance the cutting disc to the root diameter of each tooth as it is presented, removing the debris from the trailing tooth and sharpening the face of the following tooth, establishing the original form and spacing of each tooth until all teeth are sharpened. This is an easy synchronized action and accomplishes the sharpening with speed, precision, and very little exertion on the part of the operator.

In using my work holder in cooperation with the sharpener, it can be appreciated that any removal of the saw blade, or any adjustment of the set-up during the sharpening process has been eliminated until each tooth has been properly gummed, face sharpened, and given the proper rake.

In operating the work holder with the Circle Saw Setting Device U.S. Pat. No. 4,018,108, the same procedure is followed as described for the sharpening device, except that after alignment, the first tooth is positioned with the gullet of the tooth over the breaking point of the anvil; every other tooth is set with precision, and the saw is turned over and the procedure repeated on the other side.

What is claimed is as follows:

1. A hand saw work holder comprising in combination:
   a. an elongated base table of sufficient length to accommodate a hand saw, a vertical panel at each end of said base table, each panel supporting the end of a lead screw in a ball bearing saddle,
   b. a traversing table mounted on said base table for sliding movement lengthwise of said base table on guides attached to said base table,
   c. a clamp means for holding said hand saw mounted on said traversing table, and means for releasably locking said hand saw in operable position in said clamp means,
   d. a tracing dog mounted said clamp means, means on said tracing dog for engaging a groove in said lead screw, means for biasing said engaging means against said lead screw, wherein rotation of said lead screw acts through said tracing dog to move said hand saw lengthwise of said base table to position said hand saw relative to a work performing tool such as sharpener or setter.

2. A hand saw work holder according to claim 1 further comprising:
   e. an index plate, means for mounting said index plate on one end of said lead screw, means providing accurate dividing and spacing of saw teeth on said index plate including cleats mounted on the outer edge of said index plate spaced at precise intervals, and a stop finger mounted on said panel adjacent said index plate whereby said stop finger is in position to click and stop at every cleat in said index plate to accurately position each saw tooth in a proper position for sharpening or setting.

* * * * *